United States Patent
Takahashi (10) Patent No.: US 7,697,225 B2
(45) Date of Patent: Apr. 13, 2010

(54) STORAGE APPARATUS, METHOD OF CONTROLLING AMOUNT OF WRITE CURRENT OVERSHOOT IN STORAGE APPARATUS AND STORAGE MEDIUM STORING ITS PROGRAM

(75) Inventor: Tsuyoshi Takahashi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 316 days.

(21) Appl. No.: 11/901,347

(22) Filed: Sep. 17, 2007

(65) Prior Publication Data
US 2008/0151406 A1    Jun. 26, 2008

(30) Foreign Application Priority Data
Dec. 26, 2006   (JP) .............................. 2006-349425

(51) Int. Cl.
   *G11B 5/09*   (2006.01)
(52) U.S. Cl. ..................................................... 360/46
(58) Field of Classification Search ............... 360/46, 360/31, 68, 75
   See application file for complete search history.

(56) References Cited

U.S. PATENT DOCUMENTS

| | | | | |
|---|---|---|---|---|
| 5,426,537 A * | 6/1995 | Yeh et al. | ....................... | 360/46 |
| 6,429,987 B1 * | 8/2002 | Cheng | .......................... | 360/46 |
| 6,826,003 B1 * | 11/2004 | Subrahmanyam | ............ | 360/46 |
| 6,870,697 B2 * | 3/2005 | Ikekame et al. | ............... | 360/46 |
| 6,914,738 B2 * | 7/2005 | Fujiwara et al. | ............... | 360/68 |
| 6,975,475 B2 * | 12/2005 | Lee et al. | ....................... | 360/68 |
| 7,102,838 B2 * | 9/2006 | Kim et al. | ....................... | 360/31 |
| 7,154,687 B2 * | 12/2006 | Ikekame et al. | ............... | 360/46 |
| 7,253,978 B2 * | 8/2007 | Lee et al. | ....................... | 360/31 |
| 7,466,508 B2 * | 12/2008 | Fang et al. | .................... | 360/68 |
| 2006/0132963 A1 * | 6/2006 | Morinaga et al. | ............. | 360/75 |
| 2007/0263309 A1 * | 11/2007 | Lee et al. | ....................... | 360/31 |
| 2008/0002267 A1 * | 1/2008 | Jang et al. | ..................... | 360/46 |

FOREIGN PATENT DOCUMENTS

JP    2004-199860    7/2004

* cited by examiner

*Primary Examiner*—Fred Tzeng
(74) *Attorney, Agent, or Firm*—Greer, Burns & Crain, Ltd.

(57) ABSTRACT

A storage apparatus comprises: a current parameter varying section that can make a write current used for writing information on the storage medium and an overshoot amount corresponding to the write current variable; a detection section that detects an error rate or its corresponding error rate parameter for a plurality of combinations of the write current and overshoot amount varied by the current parameter varying section; a saturation factor calculation section that calculates a saturation factor representing a change in the error rate relative to a unit write current value from the error rate or error rate parameter detected by the detection section; and a current parameter setting section that determines current parameters based on the saturation factor obtained by the saturation factor calculation section for setting.

20 Claims, 11 Drawing Sheets

| | ERROR RATE AT WRITE CURRENT VALUE OF 10 mA | MINIMUM ERROR RATE VALUE | WRITE CURRENT VALUE AT WHICH ERROR RATE BECOMES MINIMUM | SATURATION FACTOR |
|---|---|---|---|---|
| OVS SETTING VALUE1 | −1.8 | −5.2 | 75 | −0.052 |
| OVS SETTING VALUE2 | −2.2 | −5.3 | 65 | −0.056 |
| OVS SETTING VALUE3 | −2.4 | −5.4 | 50 | −0.075 |
| OVS SETTING VALUE4 | −3.0 | −5.5 | 40 | −0.083 |
| OVS SETTING VALUE5 | −3.6 | −5.6 | 25 | −0.133 |

|  | ERROR RATE AT WRITE CURRENT VALUE OF 10 mA | MINIMUM ERROR RATE VALUE | WRITE CURRENT VALUE AT WHICH ERROR RATE BECOMES MINIMUM | SATURATION FACTOR |
|---|---|---|---|---|
| OVS SETTING VALUE1 | -1.8 | -4.6 | 55 | -0.062 |
| OVS SETTING VALUE2 | -2.2 | -4.9 | 50 | -0.068 |
| OVS SETTING VALUE3 | -2.4 | -4.9 | 40 | -0.083 |
| OVS SETTING VALUE4 | -3.0 | -4.9 | 25 | -0.127 |
| OVS SETTING VALUE5 | -3.6 | -4.7 | 20 | -0.110 |

|          | OVS1 | OVS2 | OVS3 | OVS4 | OVS5 |
|----------|------|------|------|------|------|
| 15-25mA  | 83   | 83   | 73   | 56   | 47   |
| 25-40mA  | 15   | 12   | 8    | 7    | 2    |

FIG.18

|          | OVS1 | OVS2 | OVS3 | OVS4 | OVS5 |
|----------|------|------|------|------|------|
| 15-25mA  | 83   | 83   | 73   | 56   | 47   |
| 25-40mA  | 15   | 12   | 8    | 7    | -28  |

STORAGE APPARATUS, METHOD OF CONTROLLING AMOUNT OF WRITE CURRENT OVERSHOOT IN STORAGE APPARATUS AND STORAGE MEDIUM STORING ITS PROGRAM

BACKGROUND OF THE INVENTION

1. Field of the Invention

The present invention relates to a storage apparatus, a method of controlling the amount of write current overshoot in a storage apparatus, and a storage medium storing its program and, more particularly, to a storage apparatus, a method of controlling the amount of write current overshoot in a storage apparatus, and a storage medium storing its program capable of controlling a write current and the amount of its overshoot to an optimum value which are proposed as a technique relating to record control, read control of an HDD that has recently been used in various types of products such as a desktop PC, notebook PC, server, audio-visual equipment, and automobile product, and reliability of the HDD.

2. Description of the Related Art

Along with improvement in the recording density (surface density) of HDD, linear density (BPI)/transfer rate is improved. In such a circumstance, improvement of write performance is also demanded. In order to enhance the write performance at a higher linear density and a higher transfer rate, rise- and fall-speed of a write current needs to be increased as well as current to be supplied needs to be increased.

However, the rise- and fall-speed are substantially determined by the characteristic of a PreAmplifier IC (Pre Amp) and set write current. Further, with regard to the Pre Amp, one that has an auxiliary function of determining the rise and fall characteristic, i.e., a function of controlling the amount of overshoot at the rise time of the write current, becomes popular.

Under the above situation, control of write current overshoot that influences the write performance has been widely demanded.

For example, there is known a method of controlling a write current comprising: a step that checks error rate while changing recording parameters under a test condition corresponding to the operating temperature of a disk drive; a step that selects a recording parameter value exhibiting the lowest error rate, and a step that uses a recording parameter value selected under an operating environment to optimize recording current of the disk drive (refer to, e.g., Patent Document 1 (Jpn. Pat. Appln. Laid-Open Publication No. 2004-199860)).

In the prior art disclosed in the Patent Document 1, the minimum write current and overshoot current (OSC) that fall within the limit of ensuring the head recording performance and that exhibit lowest error rate are used. In this case, if there exist two or more minimum values, a normalization technique is used.

However, such a control method of selecting the minimum value of current parameters cannot reflect the entire operating characteristics, thus posing a problem in terms of maintenance of reliability against a change in use environment, aged deterioration, and the like.

SUMMARY OF THE INVENTION

An object of the present invention is to provide a storage apparatus, a method of controlling the amount of write current overshoot in a storage apparatus, and a storage medium storing its program capable of performing control of a write current and overshoot that can ensure stable and highly reliable write capability by introducing a concept of saturation factor and optimizing current parameters (write current and overshoot amount) using one or both of saturation characteristic and influence caused by cross erase from an adjacent track.

To solve the above problem, according to a first aspect of the present invention, there is provided a storage apparatus that writes information on a storage medium using a write current, comprising: a current parameter varying section that can make a write current used for writing information on the storage medium and an overshoot amount corresponding to the write current variable; a detection section that detects an error rate or its corresponding error rate parameter for a plurality of combinations of the write current and overshoot amount varied by the current parameter varying section; a saturation factor calculation section that calculates a saturation factor representing a change in the error rate relative to a unit write current value from the error rate or error rate parameter detected by the detection section; and a current parameter setting section that determines current parameters based on the saturation factor obtained by the saturation factor calculation section for setting.

In the storage medium according to the present invention, the detection section detects the error rate and its corresponding parameter including side erase.

The storage medium according to the present invention further comprises a selection section that selects whether to allow the detection section to detect the error rate and its corresponding parameter including side erase or to detect the error rate and its corresponding parameter not including side erase.

Further, according to a second aspect of the present invention, there is provided a method of controlling the amount of write current overshoot in a storage apparatus that writes information on a storage medium using a write current, comprising: a write step that writes information on the storage medium while varying a write current and an overshoot amount corresponding to the write current; a detection step that detects an error rate or its corresponding error rate parameter for a plurality of combinations of the write current and overshoot amount varied by the write step; a saturation factor calculation step that calculates a saturation factor representing a change in the error rate relative to a unit write current value from the error rate or error rate parameter detected by the detection step; and a current parameter setting step that determines the write current and overshoot amount based on the saturation factor obtained by the saturation factor calculation step for setting.

Further, according to a third aspect of the present invention, there is provided a storage medium storing a write current overshoot amount control program that allows a computer to execute a method of controlling the amount of write current overshoot in a storage apparatus that writes information on a storage medium using a write current, the program allowing a computer to execute: a write step that writes information on the storage medium while varying a write current and an overshoot amount corresponding to the write current; a detection step that detects an error rate or its corresponding error rate parameter for a plurality of combinations of the write current and overshoot amount varied by the write step; a saturation factor calculation step that calculates a saturation factor representing a change in the error rate relative to a unit write current value from the error rate or error rate parameter detected by the detection step; and a current parameter setting step that determines the write current and overshoot amount based on the saturation factor obtained by the saturation factor calculation step for setting.

According to the present invention, it is possible to optimize the write current and overshoot at which the error rate becomes minimum in a stable manner and to provide optimum parameters capable of reducing the influence of write capability and erase from adjacent tracks to a minimum level.

Further, by optimizing the write current and overshoot, it is possible to increase the reliability of a head and the life duration especially in an apparatus provided with a head with heater.

DETAILED DESCRIPTION OF THE PREFERRED EMBODIMENTS

Embodiments of the present invention will be described below with reference to the accompanying drawings.

First Embodiment

Hereinafter, description will be given taking a magnetic disk drive as an example of a storage apparatus.

Figure 1:
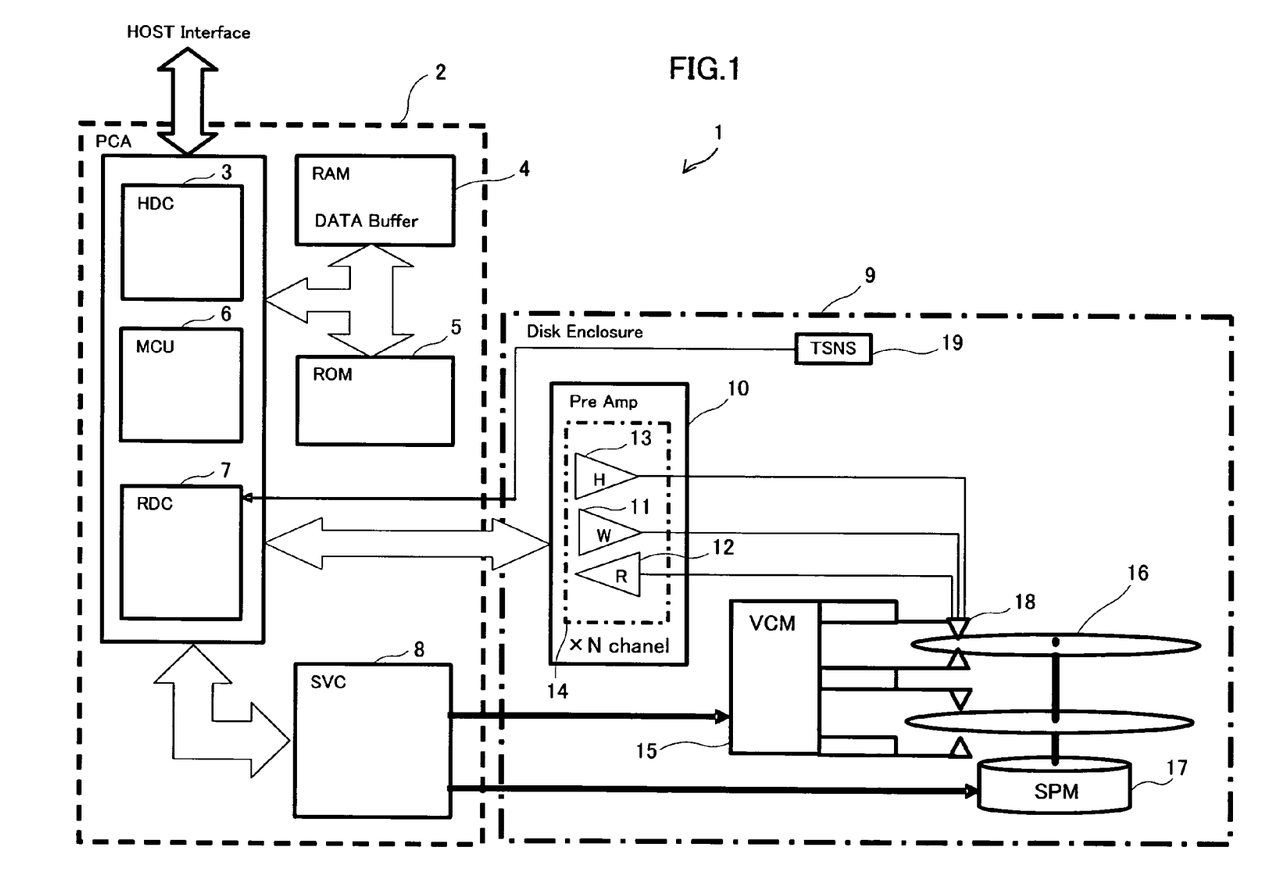
FIG. 1 is a block diagram showing a configuration of magnetic disk drive (HDD) 1 according to embodiments of the present invention.

FIG. 1 is a block diagram showing a configuration of magnetic disk drive (HDD) 1 according to the present embodiments. The HDD 1 has, on the side of a printed circuit assembly (PCA) 2 that controls operation of the HDD 1 and control communication with a HOST Interface, an HDC (Hard Disk Controller) 3 that mainly performs interface protocol control, data buffer control, and disk format control and an MCU (Micro Control Unit) 6 that controls the HDC 3 and later-described RDC (Read channel) 7 and SVC (Servo Control IC) 8 as well as manages a RAM (Random Access Memory) 4 and a ROM (Flash ROM) 5. The RDC 7 performs data write/read control (data modulation/demodulation) and SVC 8 performs VCM control and SPM control.

The HDD 1 has, on the side of a disk casing 9, a Pre Amplifier 10 which is a fixed amplifier that performs write operation for a head and read operation from the head. The number of channels provided in the Pre Amplifier 10 corresponds to the number (N) of heads.

The Pre Amplifier 10 includes a Write Driver 11, a Read Preamplifier 12, a Heater Driver 13 and a control circuit 14 therefor.

Further, the HDD 1 has an VCM (Voice Coil Motor) 15 that controls operation of an actuator supporting a head, an SPM (Spindle Motor) 17 that controls rotation of a spindle shaft holding a magnetic disk 16 which is a recording medium to which data is written for storage, and a dual head 18 having a write head for data write and an MR head for data read. In addition to the above components, the HDD 1 has a temperature sensor 19.

The HDD 1 in the embodiments corresponds to a storage apparatus of the present invention. The head 18 and Pre Amplifier 10 constitute a write section and a current parameter varying section of the present invention. Further, the RAM 4, ROM 5, and MCU 6 constitute a detection section, saturation factor calculation section, and current parameter setting section in cooperation with the head 18 and Pre Amplifier 10.

Figure 2:
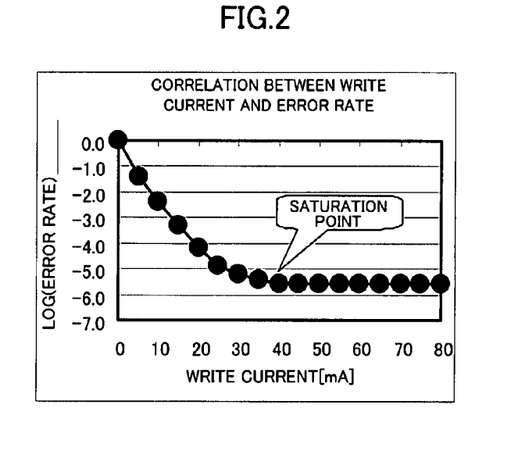
FIG. 2 is a view showing a saturation characteristic which is a correlation between a write current and error rate, which shows a characteristic in which the error rate becomes unchanged after 40 mA, i.e., the error rate is substantially saturated.
Figure 3:
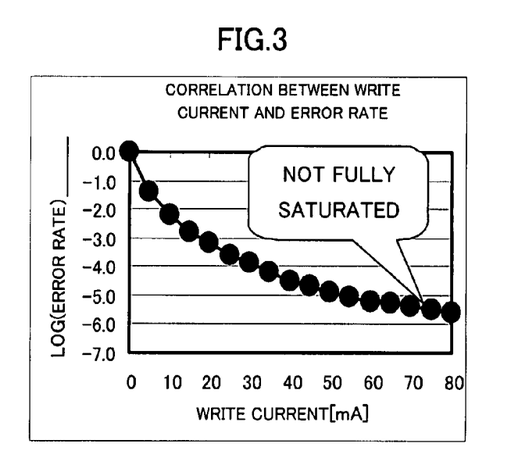
FIG. 3 is a view showing a saturation characteristic which is a correlation between a write current and error rate, which shows a non-saturated characteristic in which the error rate is not fully saturated even at 80 mA.
Figure 4:
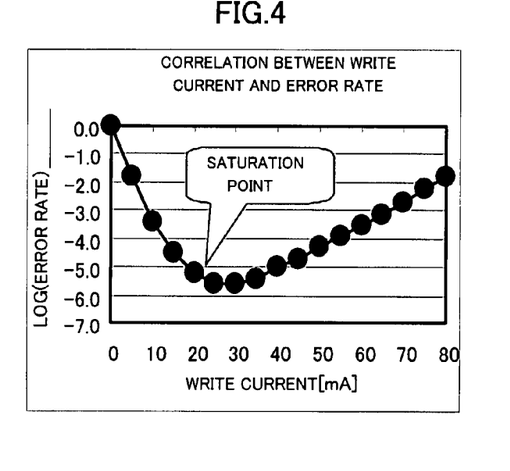
FIG. 4 is a view showing a saturation characteristic which is a correlation between a write current and error rate, which shows a super-saturated characteristic in which the error rate is substantially saturated at 25 mA and, from then on, becomes worse as the write current becomes larger.

The outline of operation in the embodiments of the present invention will be described below. FIGS. 2 and 4 each show a saturation characteristic which is a correlation between a write current and error rate. FIG. 2 shows a characteristic in which the error rate becomes unchanged after 40 mA, i.e., the error rate is substantially saturated. FIG. 3 shows a non-saturated characteristic in which the error rate is not fully saturated even at 80 mA. FIG. 4 shows a super-saturated characteristic in which the error rate is substantially saturated at 25 mA and, from then on, becomes worse as the write current becomes larger.

The phenomenon as shown in FIG. 4 is a phenomenon in which data that has been recorded on a magnetic disk medium is erased by a magnetic field generated by application of an excessive current and is generally referred to as "recording demagnetization".

Figure 5:
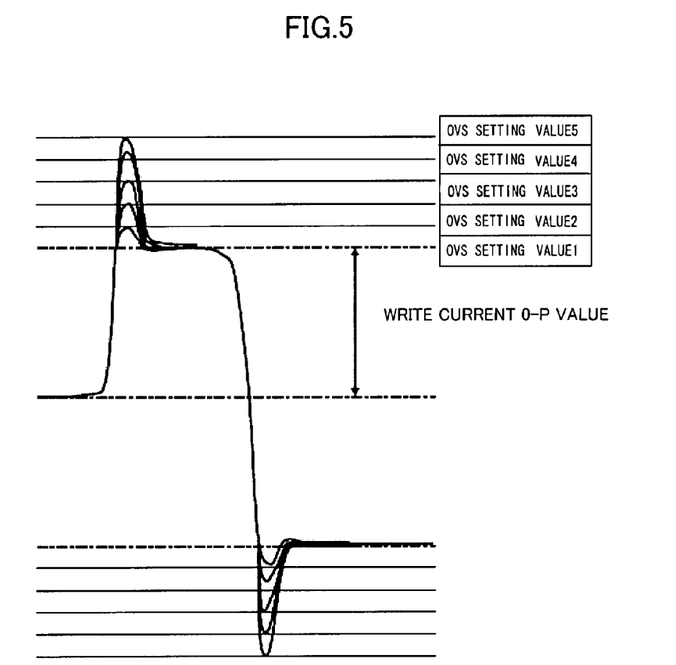
FIG. 5 is a view showing write current overshoot setting values.
Figure 6:
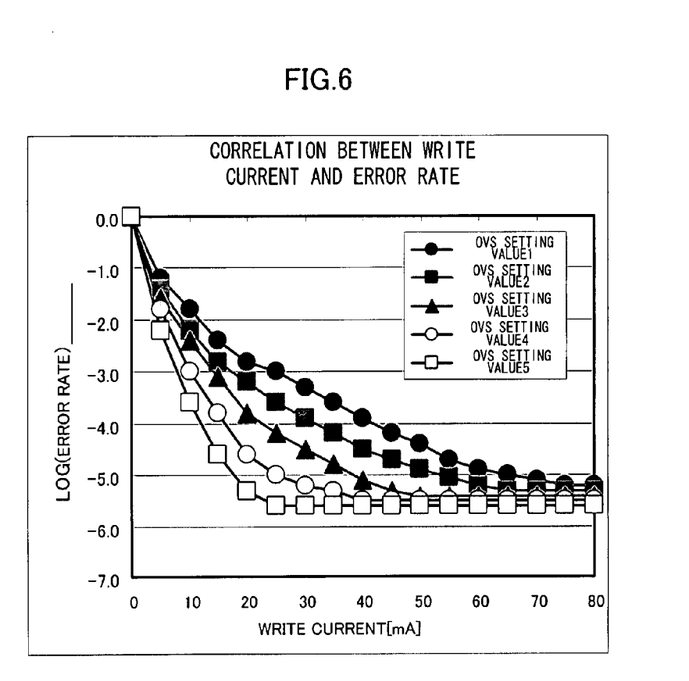
FIG. 6 is a view showing a correlation between the write current and error rate, which is obtained by changing the write current relative to the respective overshoot setting values.

FIG. 5 shows write current overshoot setting values. The amount of overshoot is given by a percentage (%) value of a write current 0-P value. In this example, five-level setting values (OVS setting 1 to OVS setting 5) are shown. FIG. 6 is a view showing a correlation between the write current and error rate, which is obtained by changing the write current relative to the respective overshoot setting values.

It can be seen from FIG. 6 that the error rate is saturated at an earlier time and reaches its minimum value at lowe current value as the overshoot setting value becomes larger (i.e., percentage value becomes larger). The write current induces heat in the head 18 to increase the temperature of a head element. It follows that high temperature use environment may adversely affect the life of the head. In light of this, it is preferable that the write current be reduced to a lowest possible level.

Further, the head element portion is expanded by the generated heat in the direction that reduces a space between itself and a medium (magnetic disk), so that an interference action between the head and medium (HDI: HEAD DISK INTERFERENCE), i.e., margin of safety against head crash is reduced. Also from the viewpoint of this, it is preferable that the write current be reduced to a lowest possible level.

An example of a method for calculating the optimum overshoot setting value will be described using the example of FIG. 6. In the embodiment of the present invention, saturation factor defined by the following expression is introduced and applied to the example of FIG. 6 to determine the optimum value of current parameters.

Saturation factor=[(minimum error rate value)−(error rate at given specified write current value)]/ [(write current value at which error rate becomes minimum)−(given specified write current value)]  (1)

That is, the saturation factor represents "error rate change relative to unit write current value".

Figure 7:
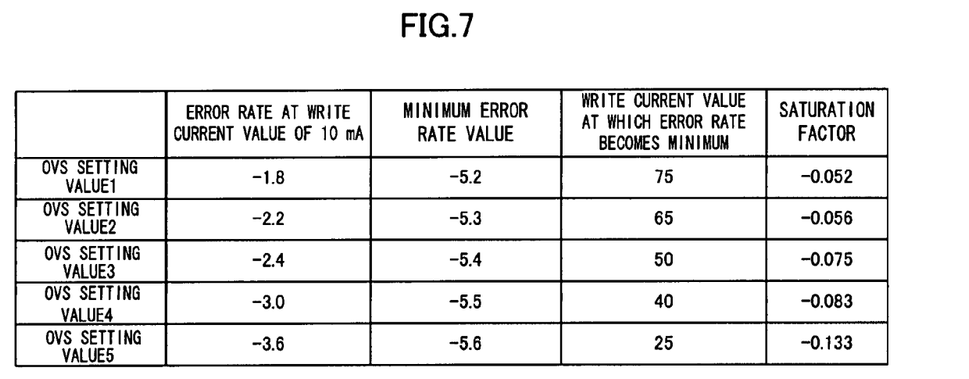
FIG. 7 is a table showing, for respective overshoot setting values (OVS setting values 1 to 5), "error rate at write current value of 10 mA", "minimum error rate value", "write current value at which error rate becomes minimum", and "saturation factor"

FIG. 7 shows saturation factors calculated for respective OVS setting values shown in FIG. 6. More specifically, a table shown in FIG. 7 shows, for respective overshoot setting values (OVS setting values 1 to 5), "error rate at write current value of 10 mA", "minimum error rate value", "write current value at which error rate becomes minimum", and "saturation factor". "Given specified write current value" in the above expression (1) that defines the saturation factor corresponds to 10 mA.

By providing a given standard for the saturation factor in the result of FIG. 7 obtained as described above, the overshoot setting value to be selected is determined. In this case, assuming that saturation factor≦−0.08, OVS setting value 4 or OVS setting value 5 is selected.

Further, in order to obtain an optimum solution, one that has a lower saturation factor and lower error rate is selected from among the two OVS setting values 4 and 5. Consequently, "OVS setting value 5/write current 25 mA" is selected.

Figure 8:
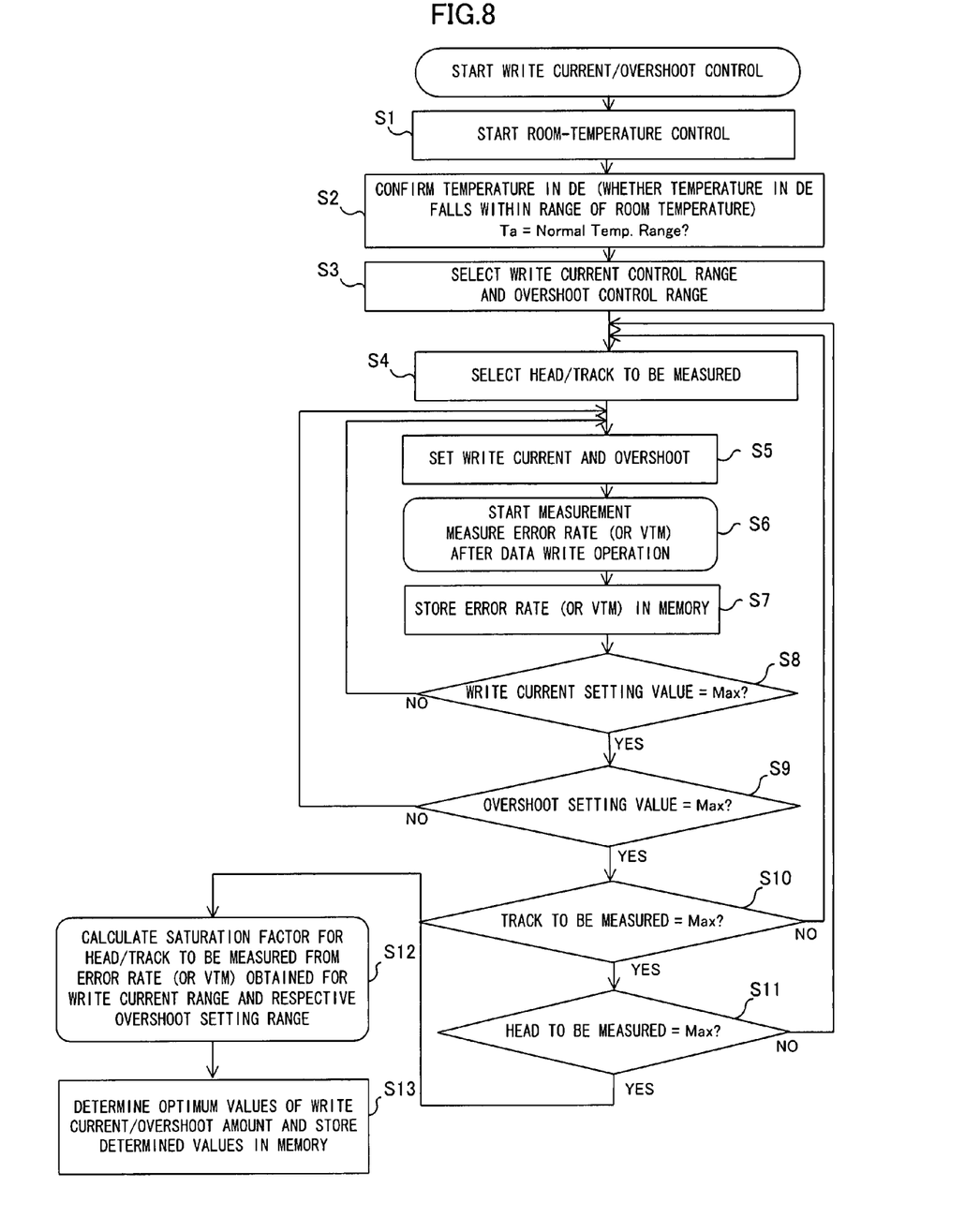
FIG. 8 is a flowchart showing operation of a current parameter control method performed in the case where side erase is not included (taken into consideration) so as to explain the operation of the first embodiment.

Operation of a current parameter control method will be described below using a flowchart of FIG. 8. FIG. 8 is a flowchart showing the operation performed in the case where side erase is not included (taken into consideration).

The current temperature is first detected by the temperature sensor 19, and control is performed in accordance with the detected temperature (room-temperature control, low-temperature control, or high-temperature control) (steps S1 and S2). Here, room temperature control performed at room-temperature will be described.

The room-temperature control is selected and range setting for room temperature (selection of control table) is performed, and control ranges of the write current and overshoot are set (step S3). A head and track to be measured are selected (step S4). Then, one write current value and one overshoot amount are set, and write operation is performed (step S5). Then, error rate (e.g., VTM (Viterbi Trellis Margin)) is measured for data that has been written (step S6), and the obtained error rate is stored in a memory (step S7). The operation descried above is repeated for respective measurement points of the write current value and overshoot amount (steps S8 and S9). Further, the same operation is performed for another track and head to be measured (steps S10 and S11). Note that although the VTM (Viterbi Metric Margin) is also referred to as CSM (Channel Statistics Measurement), the former one is used in this specification. The VTM is defined by counts obtained in the case where a difference between metric values associated with two paths falls below a given threshold value and given by the total sum of the counts at 100-sector (about 400,000 bits) read time.

After data sets as shown in FIG. 7 are collected, this table is used to calculate the saturation factor (step S12). Finally, the minimum values of the write current and overshoot amount are selected and stored in a memory as current parameter setting values (step S13).

Second Embodiment

In a second embodiment of the present invention, a case where side erase is taken into consideration will be described.

Figure 9:
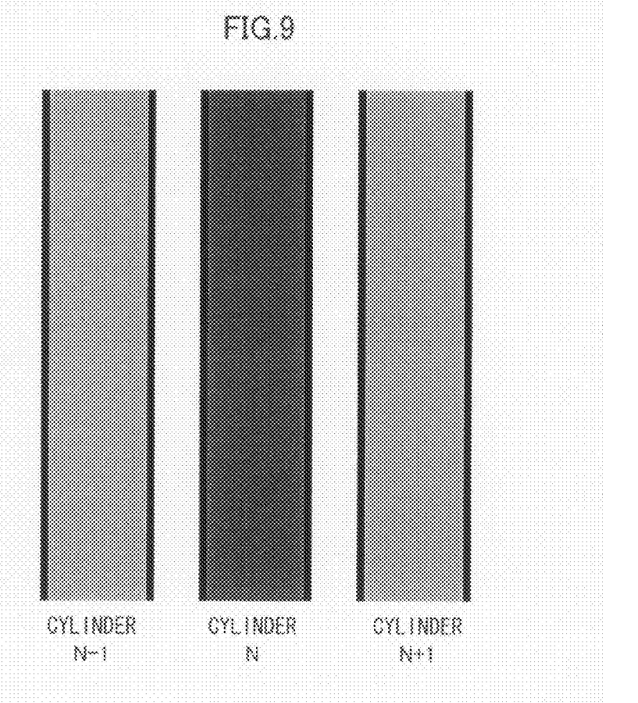
FIG. 9 is a view showing a plurality of tracks (cylinders) of a magnetic disk.
Figure 10:
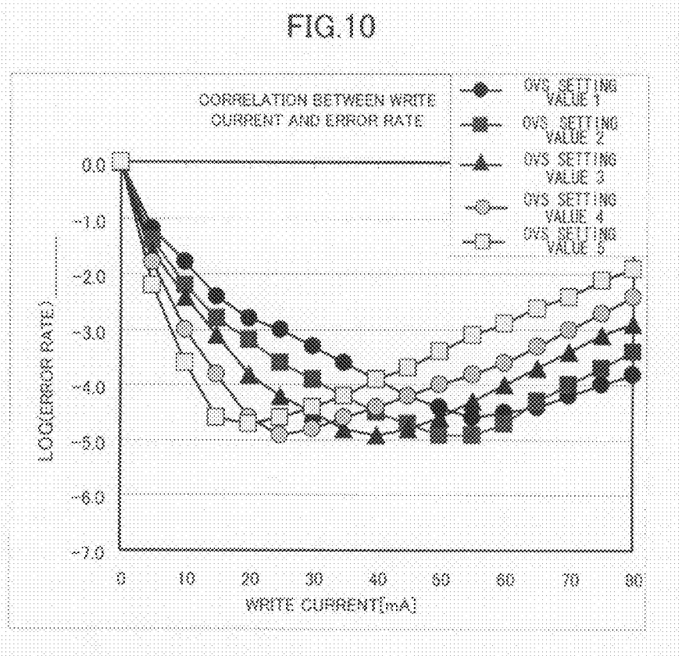
FIG. 10 shows a state of a change of the error rate in the case where m write operations are performed for cylinders N−1 and N+1.

FIG. 9 is a view showing a plurality of tracks (cylinders) of a magnetic disk. In the present embodiment, as shown in FIG. 9, a countermeasure (current parameter control) taken against a case where the error rate is changed due to influence of side erase when data different from that to be written into a cylinder (track) N to be measured are written into cylinders N−1 and N+1 located on both sides of the cylinder N will be described. FIG. 10 shows a state of the change of the error rate in the case where m write operations are performed for the cylinders N−1 and N+1.

Figure 11:
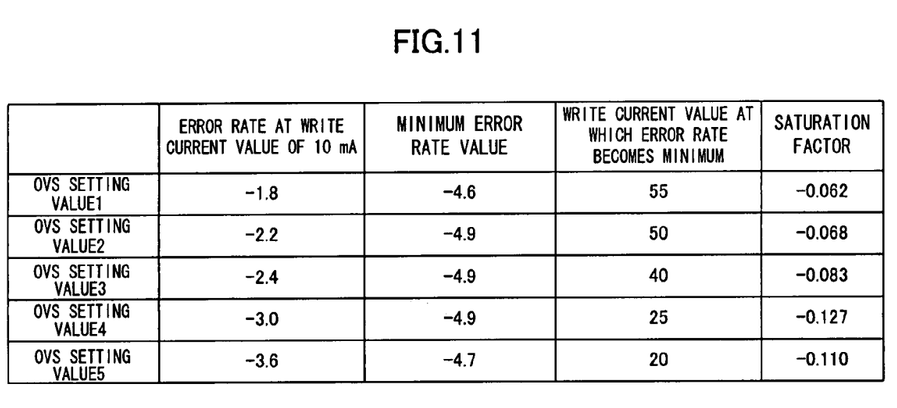
FIG. 11 is a table showing, for respective overshoot setting values shown in FIG. 10, "minimum error rate value" and "saturation factor" after side erase.

Minimum error rate value and saturation factor after occurrence of side erase is calculated as in the case of the first embodiment based on the measurement result shown in FIG. 10, and a result shown in FIG. 11 can be obtained. In the result of FIG. 11 obtained as described above, the optimum value at which the saturation factor becomes minimum is "OVS setting value 4/write current 25 mA".

Thus, while the optimum solution in the case where write operation is not performed for adjacent tracks is "OVS setting value 5/write current 25 mA" (first embodiment), the optimum solution in the case where write operation is performed for adjacent tracks (in the case where there is influence of side erase) is "OVS setting value 4/write current 25 mA".

Figure 12:
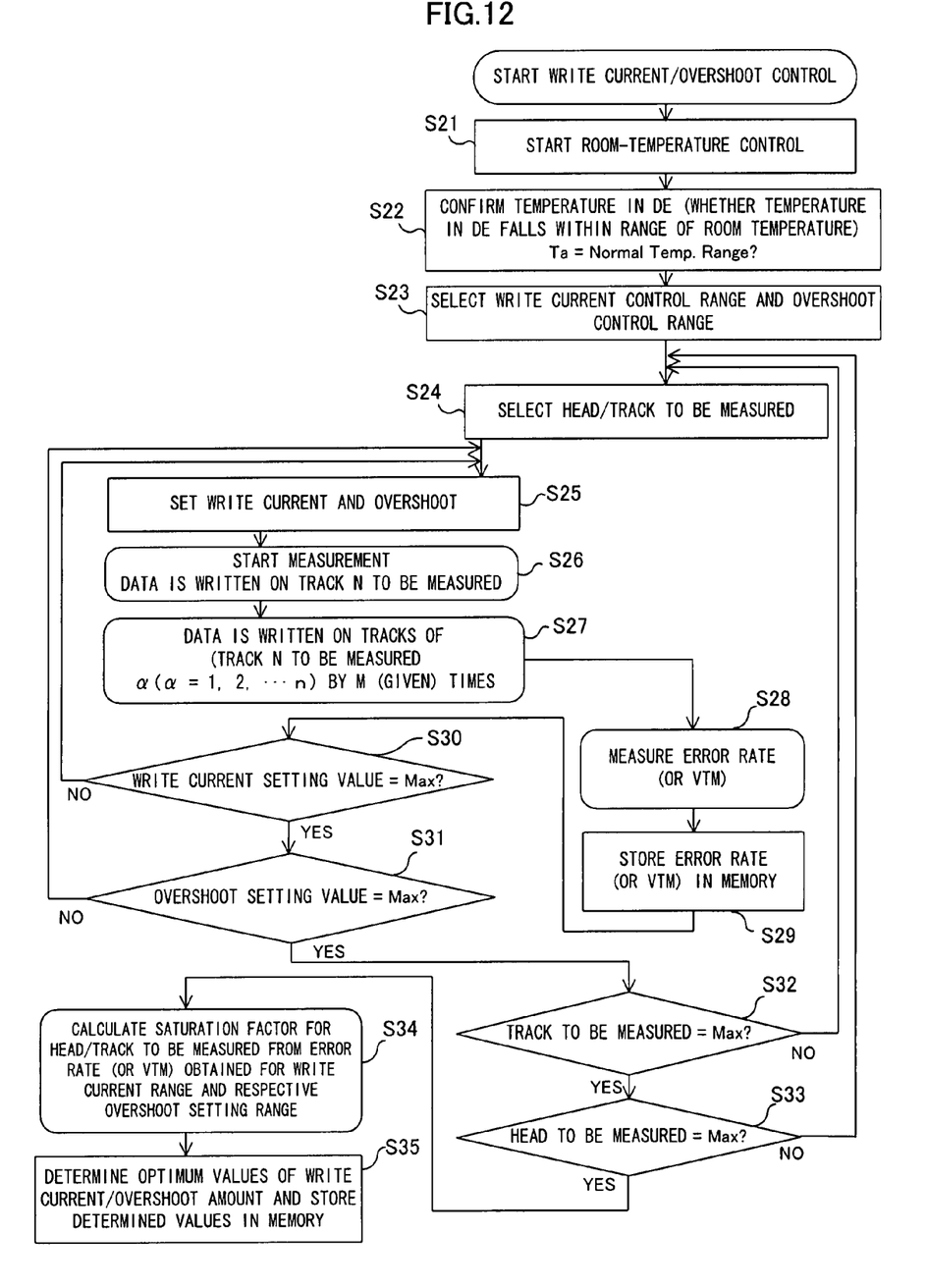
FIG. 12 is a flowchart showing operation of a current parameter control method performed in the case where side erase is not included (not taken into consideration) so as to explain the operation of a second embodiment.

Operation of a current parameter control method will be described below using a flowchart of FIG. 12. FIG. 12 is a flowchart showing the operation performed in the case where side erase is included (taken into consideration).

The current temperature is first detected by the temperature sensor 19, and control is performed in accordance with the detected temperature (room-temperature control, low-temperature control, or high-temperature control) (steps S21 and S22). Here, room-temperature control performed at room temperature will be described.

The room-temperature control is selected and range setting for room temperature (selection of control table) is performed, and control ranges of the write current and overshoot are set (step S23). A head and track to be measured are selected (step S24). Then, one write current value and one overshoot amount are set (step S25).

Data is written on the track N (step S26), and data is written on tracks of (track to be measured±α (α=1, 2, 3, ... n)) by M (given) times (step S27). Then, the error rate (e.g., VTM) is measured for the data that has been written (step S28) and the obtained error rate is stored in a memory (step S29).

The operation descried above is repeated for respective measurement points of the write current value and overshoot amount (steps S30 and S31). Further, the same operation is performed for another track and head to be measured (steps S32 and S33).

After data sets as shown in FIG. 11 are collected, this table is used to calculate the saturation factor (step S34). Finally, the minimum values of the write current and overshoot amount are selected and stored in a memory as current parameter setting values (step S35).

Whether to employ the control method according to the first embodiment or second embodiment depends on TPI value (track density). That is, in the case where the TPI value becomes large, a track becomes more subject to the influence of its adjacent tracks, so that it is desirable to employ the control method of the second embodiment in which side erase is taken into consideration. On the other hand, in the case where the TPI value is not so large, it is desirable to employ the control method of the first embodiment in terms of advantage in processing time.

Third Embodiment

In a third embodiment of the present invention, candidates of current parameters whose values are not more than a threshold value with respect to a saturation factor (not including side erase) are obtained, and a saturation factor (including side erase) is further calculated as a current parameter for the obtained candidates to thereby determine final current parameters.

Figure 13:
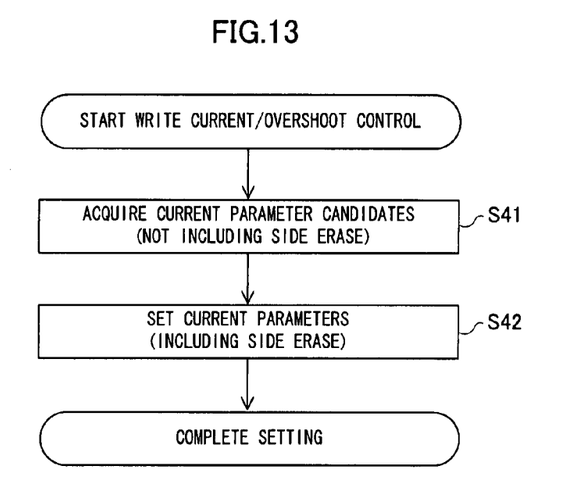
FIG. 13 is a flowchart showing operation according to a third embodiment.

FIG. 13 is a flowchart showing operation according to the third embodiment. First, candidates of current parameters are acquired (step S41). This processing operation is achieved by performing the sequence of steps S1 to S12 shown in FIG. 8 as well as a process of selecting and acquiring current parameters that meet a predetermined saturation factor based on the saturation factor obtained in step S12. After the candidates of current parameters have been acquired, setting of the current parameters is made taking side erase into consideration (step S42). This processing is achieved by performing the sequence of steps S24 to S35 shown in FIG. 12 for the acquired current parameter candidates.

According to the third embodiment, calculation of the saturation factor (current setting) that takes side erase into consideration can finally be made for a small number of current parameters, thereby reducing the processing time.

Fourth Embodiment

Figure 14:
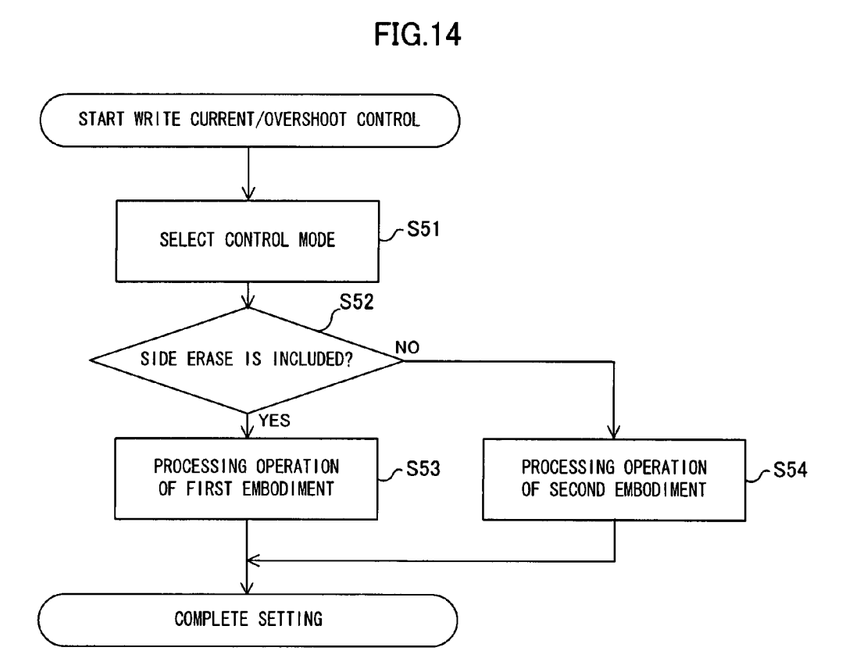
FIG. 14 is a flowchart showing operation according to a fourth embodiment.

In a fourth embodiment of the present invention, the setting of current parameters made based on the calculation of the saturation factor including side erase and setting of current parameters made based on the calculation of the saturation factor not including side erase are selected depending on the type of a magnetic disk to be used. FIG. 14 is a flowchart showing operation according to the fourth embodiment.

In the fourth embodiment, the operation (control mode) of the first embodiment and operation (control mode) of the second embodiment are made selectable. There is less need to take side erase into consideration for a magnetic disk whose recording density is not high and, in this case, the operation (side erase "non-considering" mode) of the first embodiment is selected (steps S51, S52, and S53). On the other hand, it is desirable to take side erase into consideration for a magnetic disk whose recording density is increased in terms of increase in reliability and, in this case, the operation (side erase "considering" mode) of the second embodiment is selected (steps S51, S52, and S54).

According to the fourth embodiment, it is possible to select the control mode ((side erase "considering"/"non-considering" mode) of the current parameters according to the need, thereby improving the usability.

Fifth Embodiment

An example in which a simple error rate measurement section (trellis margin in a Viterbi detection circuit) is used as the error rate will be described. Although the above description mentions "VTM is defined by counts obtained in the case where a difference between metric values associated with two paths falls below a given threshold value and given by the total sum of the counts at 100-sector (about 400,000 bits) read time", trellis margin is given by logarithm of counts that fall below a given threshold. For example, in the case of 1000 counts, notation becomes LOG(1000)=3.0; and in the case of 10000 counts, notation becomes LOG(10000)=4.0. The vertical axes of FIGS. 15 and 16 denote this meaning.

Figure 15:
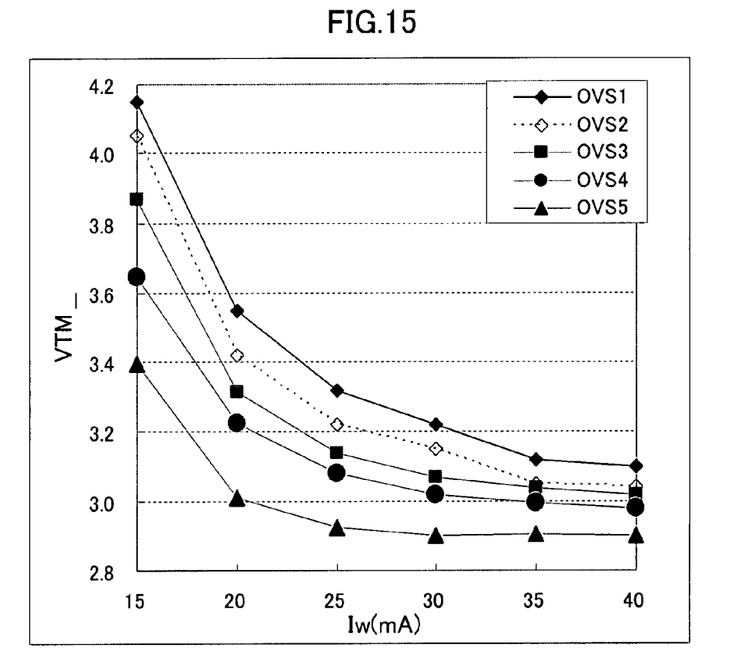
FIG. 15 is a first graph showing a correlation between the write current and VTM with respect to five-level overshoot amounts so as to explain a fifth embodiment.

FIG. 15 shows an example in which five-level (OVS setting 1 to OVS setting 5) overshoot amounts are set. In this case, a saturation characteristic in which the trellis margins of respective OVS setting values are monotonously decreasing is shown.

Figure 16:
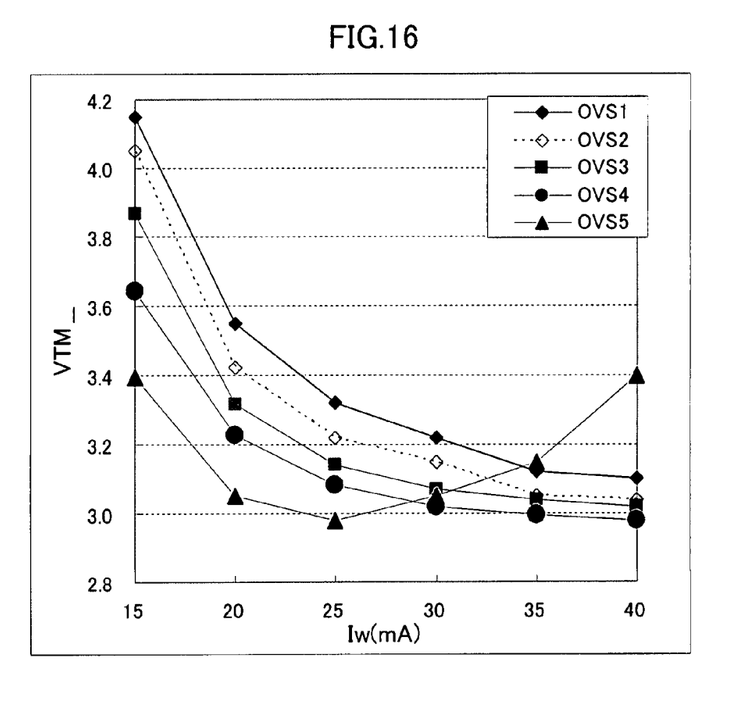
FIG. 16 is a second graph showing a correlation between the write current and VTM with respect to five-level overshoot amounts so as to explain the fifth embodiment.

On the other hand, in FIG. 16, the trellis margins of OVS 1 to OVS 4 are monotonously decreasing; while trellis margin of OVS 5 once reaches its minimum value and increased from then on.

Figure 17:
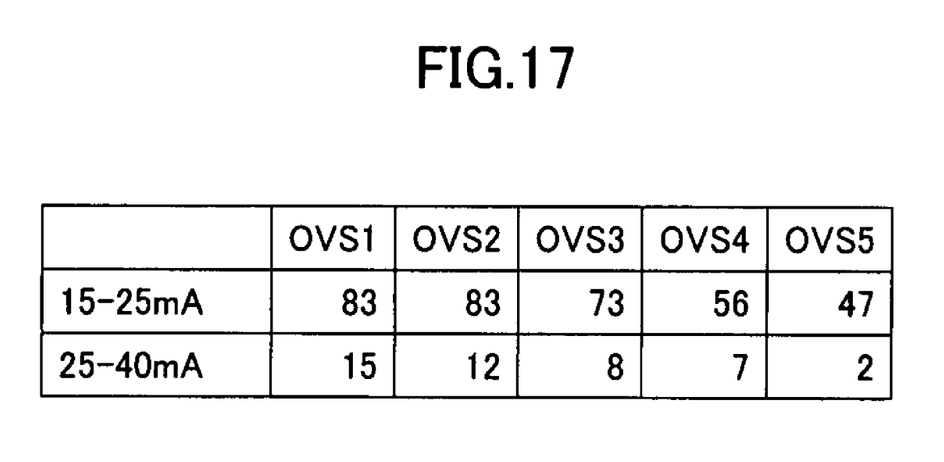
FIG. 17 is a table showing a case where the saturation factors of FIG. 15 are calculated for respective current setting value range zones of 15 mA to 25 mA and 25 mA to 40 mA.

This phenomenon is referred to as "recording demagnetization" shown in FIG. 4 which is an unfavorable phenomenon that the error rate becomes worse with an increase in the write current. Here, the write current setting value is divided into two range zones: "15 mA to 25 mA" and "25 mA to 40 mA", and the saturation factors of FIGS. 15 and 16 are calculated for respective range zones. Results are shown in FIGS. 17 and 18, respectively.

Since the saturation factor represents "error rate change relative to unit write current value", trellis margin tends to exhibit better characteristic as its change amount becomes smaller. In the case of FIG. 17, the OVS 5 exhibits the lowest value in both range zones of "15 mA to 25 mA" and "25 mA to 40 mA", so that the OVS 5 is selected as the final OVS setting.

Figure 18:
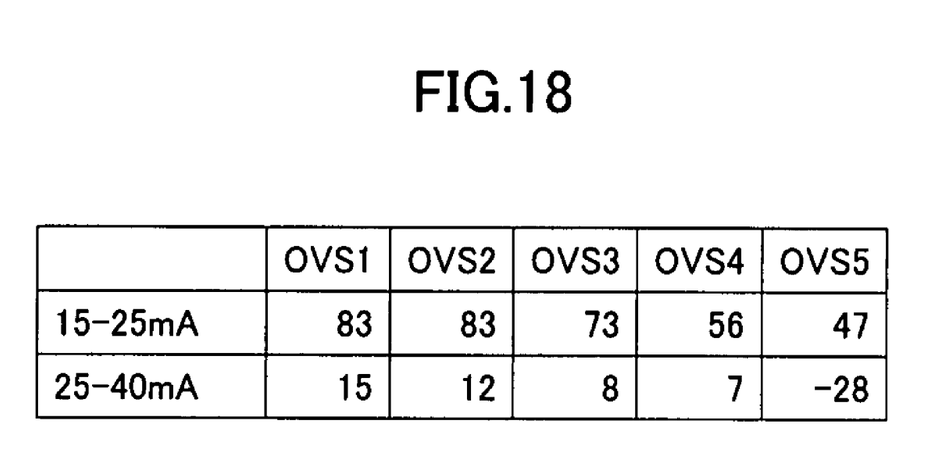
FIG. 18 is a table showing a case where the saturation factors of FIG. 16 are calculated for respective current setting value range zones of 15 mA to 25 mA and 25 mA to 40 mA.

On the other hand, in the case of FIG. 18, although the OVS 5 exhibits the lowest value in the range zone of "15 mA to 25 mA", it exhibits negative value in the range zone of "25 mA to 40 mA", i.e., the recording demagnetization seems to occur.

The negative saturation factor represents deterioration of the error rate, so that the OVS exhibiting a negative value is excluded from selection. Therefore, in this case, the OVS 4 which exhibits the lowest positive value in both the range zones of "15 mA to 25 mA" and "25 mA to 40 mA" is selected.

In the fifth embodiment, the write current is divided into a plurality of range zones in calculating the saturation factor, and the write current and overshoot amount exhibiting the lowest positive values are selected from the saturation factors in the respective range zones. This configuration allows setting of the current parameters with higher accuracy. Note that, it can be seen from the graphs of FIGS. 15 and 16, the division of the write current value into a plurality of range zones can automatically be made at the point (e.g., change point of polarity) at which change rate of the error rate (trellis margin) relative to the write current is suddenly changed.

As described above, according to the embodiments of the present invention, a concept of the saturation factor and error rate (or its alternative (e.g., trellis margin as a simple error rate measurement section in a Viterbi detection circuit)) are used to optimize the write current and overshoot at which the error rate becomes minimum in a stable manner and to provide optimum parameters capable of reducing the influence of write capability and erase from adjacent tracks to a minimum level.

Further, when a program that allows a computer to execute the above operation steps shown in the flowcharts of the embodiment, a control program of the present invention can be provided. By storing this control program in a computer-readable storage medium, it is possible to allow the computer to execute the program. The computer mentioned here includes: a host device such as a personal computer, a controller for a test apparatus, and a controller such as MPU or CPU of a storage apparatus. The computer-readable medium mentioned here includes: a portable storage medium such as a CD-ROM, a flexible disk, a DVD disk, a magneto-optical disk, or an IC card; a database that holds computer program; another computer and database thereof; and a transmission medium on a network line.

What is claimed is:

1. A storage apparatus that writes information on a storage medium using a write current, comprising:
   a current parameter varying section that can make a write current used for writing information on the storage medium and an overshoot amount corresponding to the write current, variable;
   a detection section that detects an error rate or an error rate parameter corresponding to the error rates for a plurality of combinations of the write current and the overshoot amount varied by the current parameter varying section;
   a saturation factor calculation section that calculates a saturation factor representing a change in the error rate relative to a unit write current value from the error rate or the corresponding error rate parameter detected by the detection section; and
   a current parameter setting section for setting current parameters based on the saturation factor obtained by the saturation factor calculation section.

2. The storage apparatus according to claim 1, wherein the detection section detects the error rate or the corresponding error rate parameter including side erase.

3. The storage apparatus according to claim 1, further comprising a selection section that selects whether to allow the detection section to detect the error rate or the corresponding error rate parameter including side erase or to detect the error rate or the corresponding error rate parameter not including side erase.

4. The storage apparatus according to claim 1, further comprising a current parameter setting control section that allows the detection section to detect a first error rate parameter not including side erase and allows the saturation factor calculation section to calculate a first saturation factor based on the first error rate parameter to thereby acquire current parameter candidates from the first saturation factor, and allows the detection section to detect a second error rate parameter including side erase with respect to the current parameter candidates, allows the saturation factor calculation section to calculate a second saturation factor based on the second error rate parameter, and allows the current parameter setting section to set the current parameters based on the second saturation factor.

5. The storage apparatus according to claim 1, wherein the detection section detects a VTM as the error rate parameter corresponding to the error rate.

6. The storage apparatus according to claim 1, wherein the saturation factor calculation section sets a plurality of zones for which the saturation factor is calculated based on a relationship between the write current and the error rate or the corresponding error rate parameter obtained by the detection section and calculates the saturation factor in respective zones, and
   the current parameter setting section determines the current parameters based on a plurality of saturation factors obtained in the respective zones.

7. The storage apparatus according to claim 1, wherein the storage apparatus is a magnetic disk apparatus using a magnetic disk as the storage medium.

8. A method of controlling the amount of write current overshoot in a storage apparatus that writes information on a storage medium using a write current, comprising:
   a write step that writes information on the storage medium while varying a write current and an overshoot amount corresponding to the write current;
   a detection step that detects an error rate or an error rate parameter corresponding to the error rate for a plurality of combinations of the write current and the overshoot amount varied by the write step;
   a saturation factor calculation step that calculates a saturation factor representing a change in the error rate relative to a unit write current value from the error rate or the corresponding error rate parameter detected by the detection step; and
   a current parameter setting step for setting current parameters based on the saturation factor obtained by the saturation factor calculation step.

9. The method of controlling the amount of write current overshoot in a storage apparatus according to claim 8, wherein
   the detection step detects the error rate or the corresponding error rate parameter including side erase.

10. The method of controlling the amount of write current overshoot in a storage apparatus according to claim 8, further comprising a selection step that selects whether to allow the detection step to detect the error rate or the corresponding error rate parameter including side erase or to detect the error rate or the corresponding error rate parameter not including side erase.

11. The method of controlling the amount of write current overshoot in a storage apparatus according to claim 8, further comprising:
   a current parameter candidate acquisition step that allows the detection step to detect a first error rate parameter not including side erase and allows the saturation factor calculation step to calculate a first saturation factor based on the first error rate parameter to thereby acquire current parameter candidates from the first saturation factor, wherein
   the current parameter setting step allows the detection step to detect a second error rate parameter including side erase with respect to the current parameter candidates acquired by the current parameter candidate acquisition step, allows the saturation factor calculation step to calculate a second saturation factor based on the second error rate parameter to thereby set the current parameters based on the second saturation factor.

12. The method of controlling the amount of write current overshoot in a storage apparatus according to claim 8, wherein the detection step detects a VTM as the error rate parameter corresponding to the error rate.

13. The method of controlling the amount of write current overshoot in a storage apparatus according to claim 8, wherein
    the saturation factor calculation step sets a plurality of zones for which the saturation factor is calculated based on a relationship between the write current and the error rate or the corresponding error rate parameter obtained by the detection step and calculates the saturation factor in respective zones, and
    the current parameter setting step determines the current parameters based on a plurality of saturation factors obtained in the respective zones.

14. The method of controlling the amount of write current overshoot in a storage apparatus according to claim 8, wherein
    the storage apparatus is a magnetic disk apparatus using a magnetic disk as a storage medium.

15. As disk medium storing a write current overshoot amount control program that allows a computer to execute a method of controlling the amount of write current overshoot in a storage apparatus that writes information on a storage medium using a write current, the program allowing a computer to execute:
    a write step that writes information on the storage medium while varying a write current and an overshoot amount corresponding to the write current;
    a detection step that detects an error rate or an error rate parameter corresponding to the error rate for a plurality of combinations of the write current and the overshoot amount varied by the write step;
    a saturation factor calculation step that calculates a saturation factor representing a change in the error rate relative to a unit write current value from the error rate or the corresponding error rate parameter detected by the detection step; and
    a current parameter setting step for setting current parameters based on the saturation factor obtained by the saturation factor calculation step.

16. The disk medium according to claim 15, wherein
    the detection step detects the error rate or the corresponding error rate parameter including side erase.

17. The disk medium according to claim 15, further comprising a selection step that selects whether to allow the detection step to detect the error rate or the corresponding error rate parameter including side erase or to detect the error rate or the corresponding error rate parameter not including side erase.

18. The disk medium according to claim 15, further comprising:
    a current parameter candidate acquisition step that allows the detection step to detect a first error rate parameter not including side erase and allows the saturation factor calculation step to calculate a first saturation factor based on the first error rate parameter to thereby acquire current parameter candidates from the first saturation factor, wherein
    the current parameter setting step allows the detection step to detect a second error rate parameter including side erase with respect to the current parameter candidates acquired by the current parameter candidate acquisition step, allows the saturation factor calculation step to calculate a second saturation factor based on the second error rate parameter to thereby set the current parameters based on the second saturation factor.

19. The disk medium according to claim 15, wherein
    the detection step detects a VTM as the error rate parameter corresponding to the error rate.

20. The disk medium according to claim 15, wherein
    the saturation factor calculation step sets a plurality of zones for which the saturation factor is calculated based on a relationship between the write current and the error rate or the corresponding error rate parameter obtained by the detection step and calculates the saturation factor in respective zones, and
    the current parameter setting step determines the current parameters based on a plurality of saturation factors obtained in the respective zones.

* * * * *

UNITED STATES PATENT AND TRADEMARK OFFICE
CERTIFICATE OF CORRECTION

| | |
|---|---|
| PATENT NO. | : 7,697,225 B2 |
| APPLICATION NO. | : 11/901347 |
| DATED | : April 13, 2010 |
| INVENTOR(S) | : Takahashi |

It is certified that error appears in the above-identified patent and that said Letters Patent is hereby corrected as shown below:

Claim 15, Col. 11, Line 28   Delete "As disk" and insert --A disk-- in its place.

Signed and Sealed this

Seventeenth Day of August, 2010

David J. Kappos
*Director of the United States Patent and Trademark Office*